United States Patent
Cho

(10) Patent No.: US 12,118,765 B2
(45) Date of Patent: Oct. 15, 2024

(54) METHOD AND SYSTEM FOR PRODUCT SEARCH BASED ON DEEP-LEARNING

(71) Applicant: NHN Corporation, Gyeonggi-do (KR)

(72) Inventor: Myounghoon Cho, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 242 days.

(21) Appl. No.: 17/464,571

(22) Filed: Sep. 1, 2021

(65) Prior Publication Data

US 2022/0101032 A1    Mar. 31, 2022

(30) Foreign Application Priority Data

Sep. 25, 2020   (KR) ........................ 10-2020-0124360

(51) Int. Cl.
  *G06V 10/44*   (2022.01)
  *G06F 18/2413*   (2023.01)
  *G06Q 30/0601*   (2023.01)

(52) U.S. Cl.
  CPC ........ *G06V 10/44* (2022.01); *G06F 18/24133* (2023.01); *G06Q 30/0623* (2013.01); *G06Q 30/0643* (2013.01)

(58) Field of Classification Search
  CPC ...... G06V 10/44; G06V 10/422; G06V 40/10; G06V 10/469; G06F 18/24133; G06Q 30/0623; G06Q 30/0643; G06Q 30/0641; G06N 3/08; G06T 7/11; G06T 11/206
  See application file for complete search history.

(56) References Cited

U.S. PATENT DOCUMENTS

| | | |
|---|---|---|
| 10,013,710 B2 | 7/2018 | Di et al. |
| 10,878,481 B2 | 12/2020 | Di et al. |
| 2020/0265495 A1 | 8/2020 | Cho |
| 2021/0166290 A1 | 6/2021 | Di et al. |

FOREIGN PATENT DOCUMENTS

| | | | | |
|---|---|---|---|---|
| KR | 10-2011-0085951 | | 7/2011 | |
| KR | 101768521 B1 | * | 8/2017 | ......... G06F 16/5838 |
| KR | 10-1852598 | | 4/2018 | |

(Continued)

OTHER PUBLICATIONS

"Lingbo Yang et al., Towards Fine-Grained Human Pose Transfer with Detail Replenishing Network, IEEE TIP, Computer Vision and Pattern Recognition, May 2020" (Year: 2020).*

(Continued)

*Primary Examiner* — Andrae S Allison
*Assistant Examiner* — Phuong Hau Cai
(74) *Attorney, Agent, or Firm* — Womble Bond Dickinson (US) LLP

(57) ABSTRACT

A method and system for performing a deep learning based product search obtain an input image including a target product to be searched; transform a model pose included in the input image; obtain a standard input image having the transformed pose of the model; obtain a main product image having an area including the target product by performing deep learning based on the standard input image; extract a feature vector from the main product image; perform a product search for a product similar to the target product based on the feature vector; and output a result of the product search.

18 Claims, 7 Drawing Sheets

(56) References Cited

FOREIGN PATENT DOCUMENTS

KR   10-2019-0000397   1/2019
KR   10-2020-0103182   9/2020

OTHER PUBLICATIONS

"Wen-Huang Cheng et al., Fashion Meets Computer Vision: A Survey, ACM Computing Surveys, Computer Science—Computer Vision and Pattern Recognition, Mar. 2020" (Year: 2020).*
"Aliaksandr Siarohin et al., Deformable GANs for Pose-based Human Image Generation, Proceedings of the IEEE Conference on Computer Vision and Pattern Recognition (CVPR), 2018, pp. 3408-3416" (Year: 2018).*
"A. Hilsmann et al., Pose Space Image Based Rendering, May 2013, Computer Graphics Forum vol. 32, Issue 2pt3, pp. 265-274" (Year: 2013).*
Office Action dated Jun. 23, 2022 for Korean Patent Application No. 10-2020-0124360 and its English Translation from Global Dossier.
Final Office Action dated Nov. 4, 2022 for Korean Patent Application No. 10- 2020-0124360 and its English Translation from Global Dossier.

* cited by examiner

[FIG. 1]
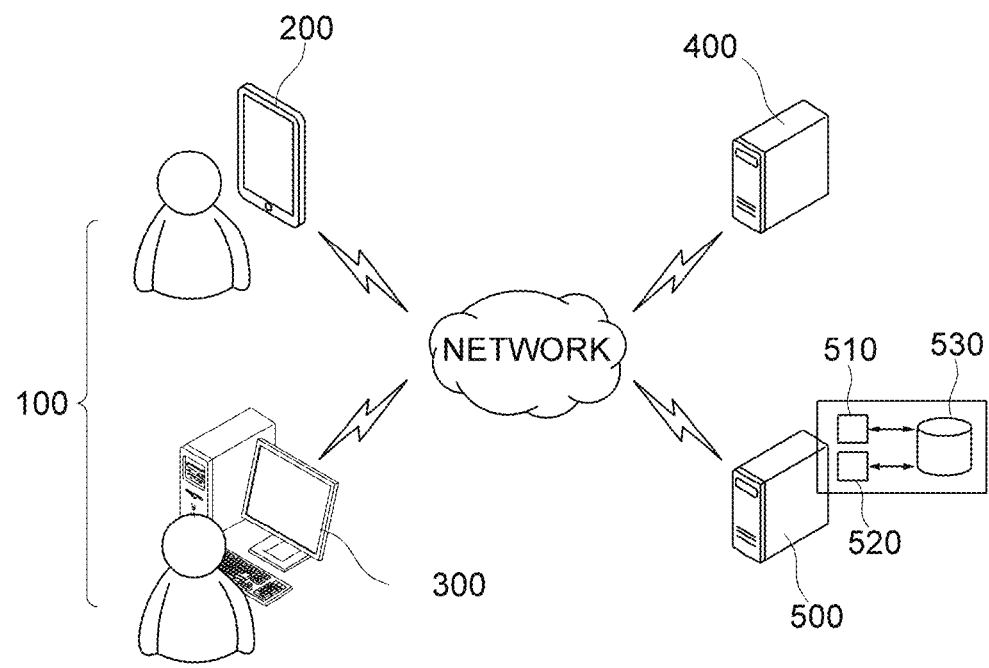

[FIG. 2]
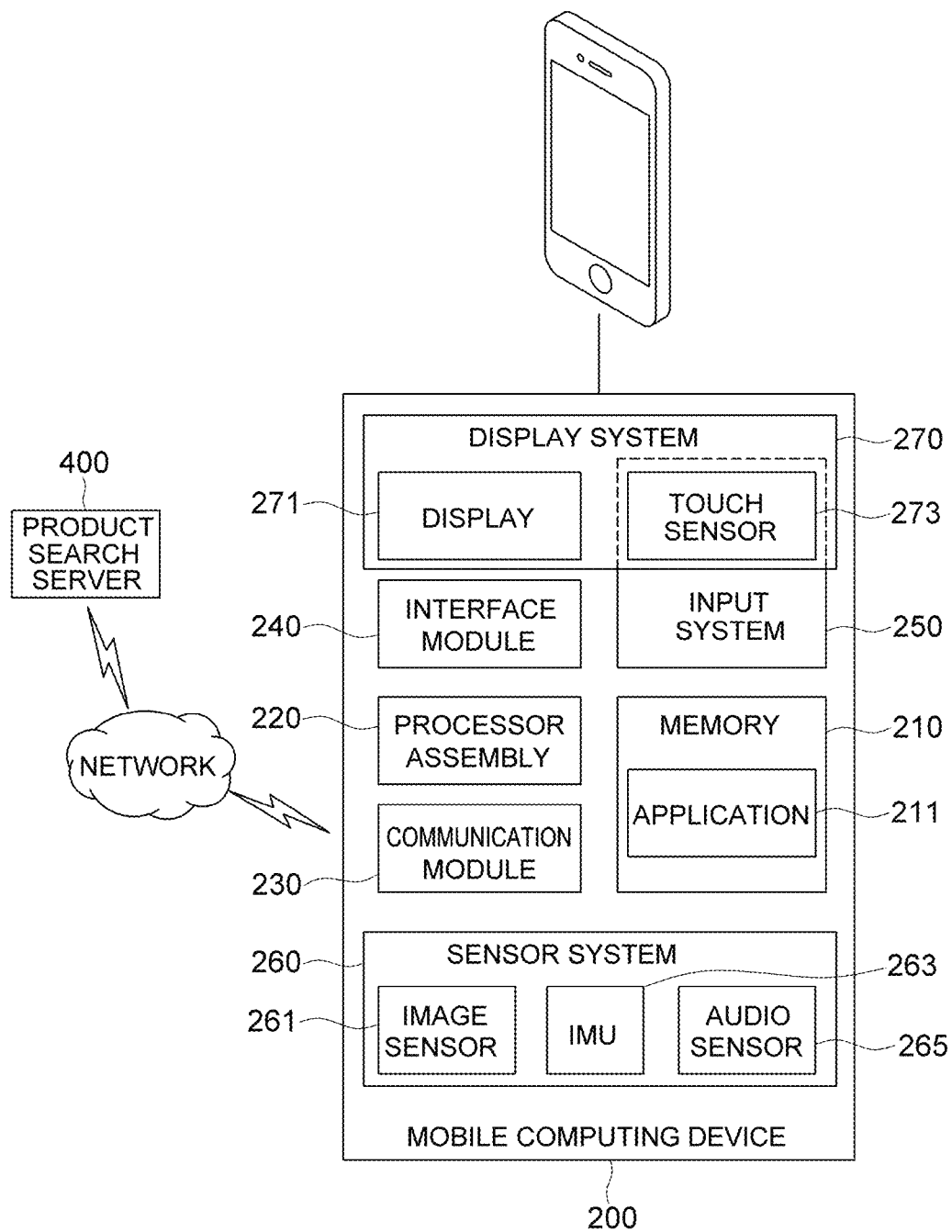

[FIG. 3]
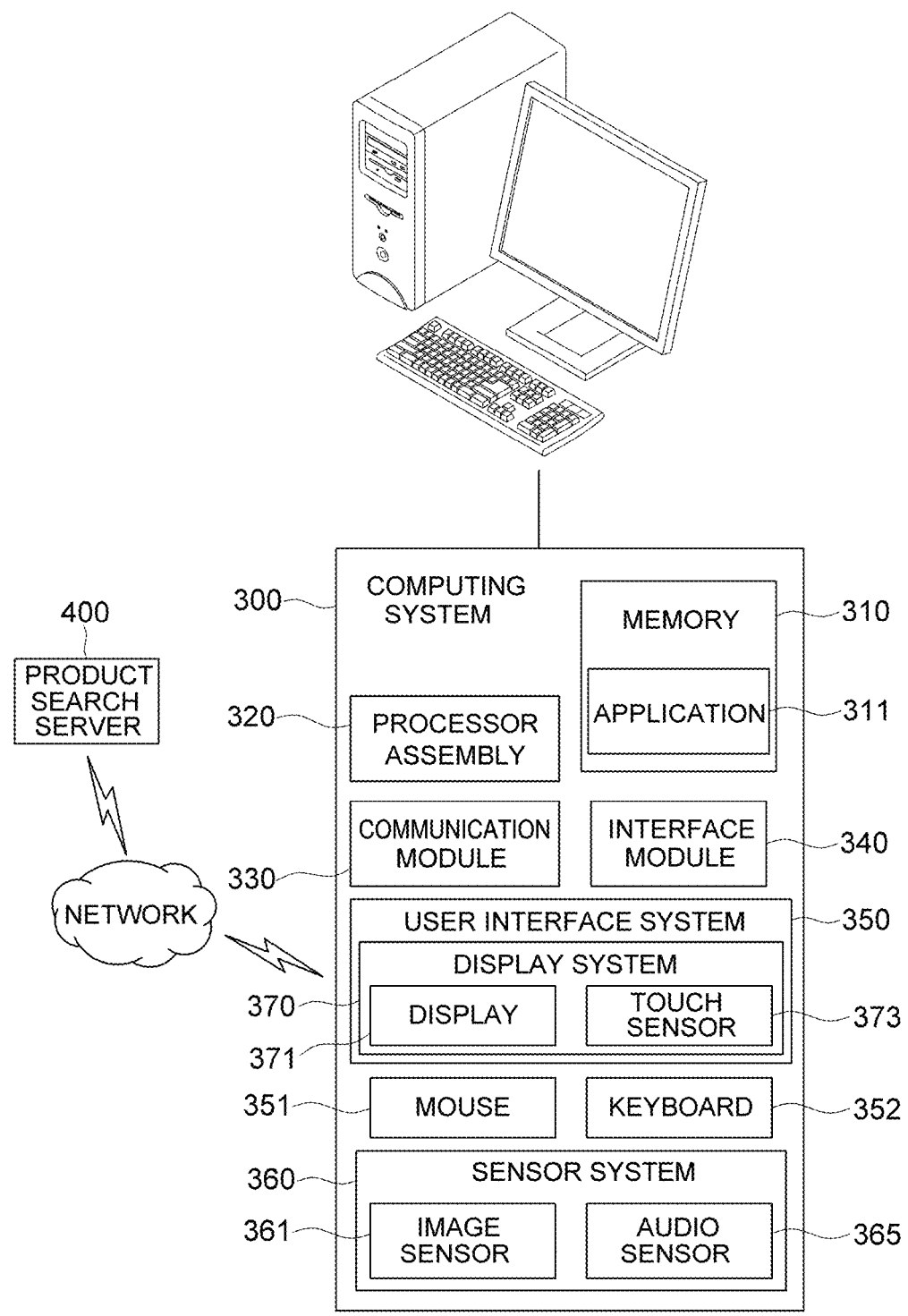

[FIG. 4]
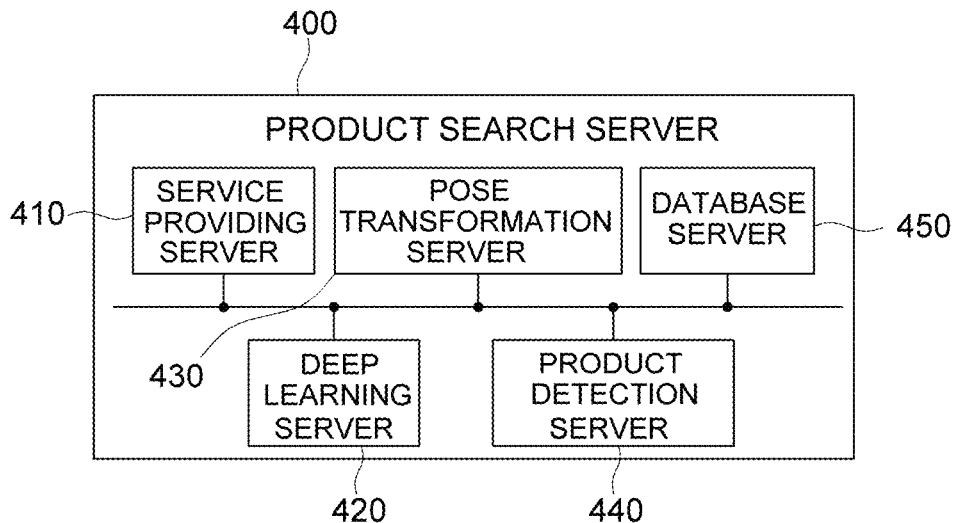
[FIG. 5]
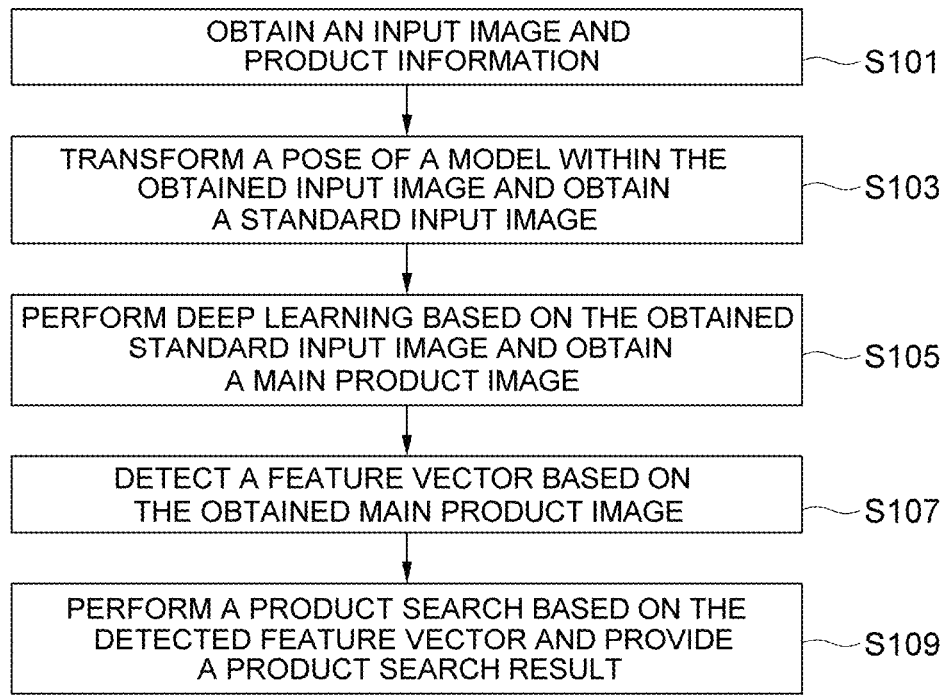

[FIG. 6]
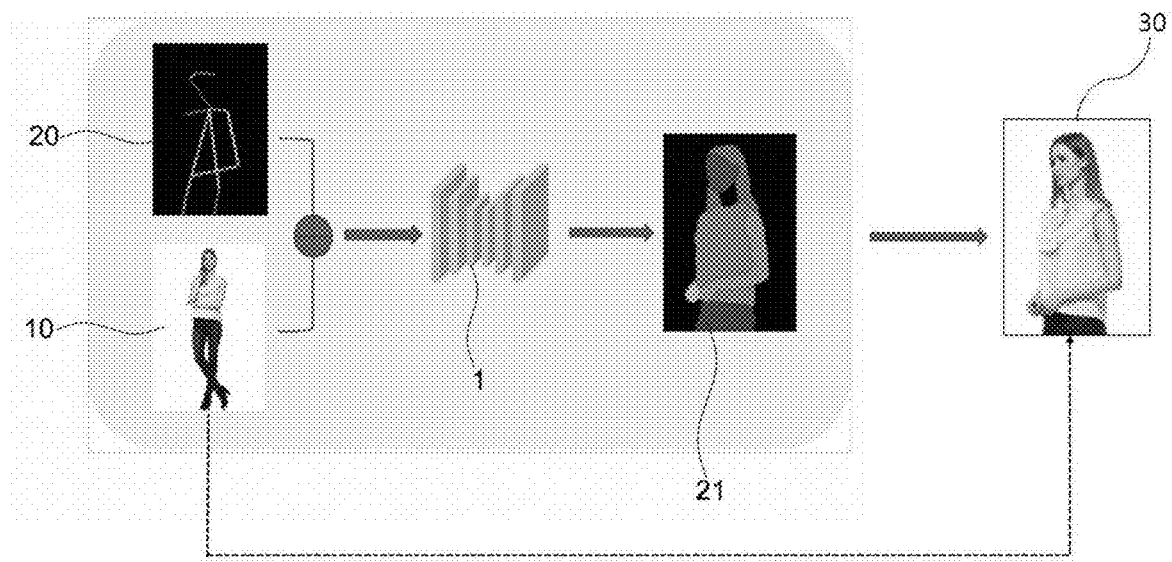
[FIG. 7]

[FIG. 8]
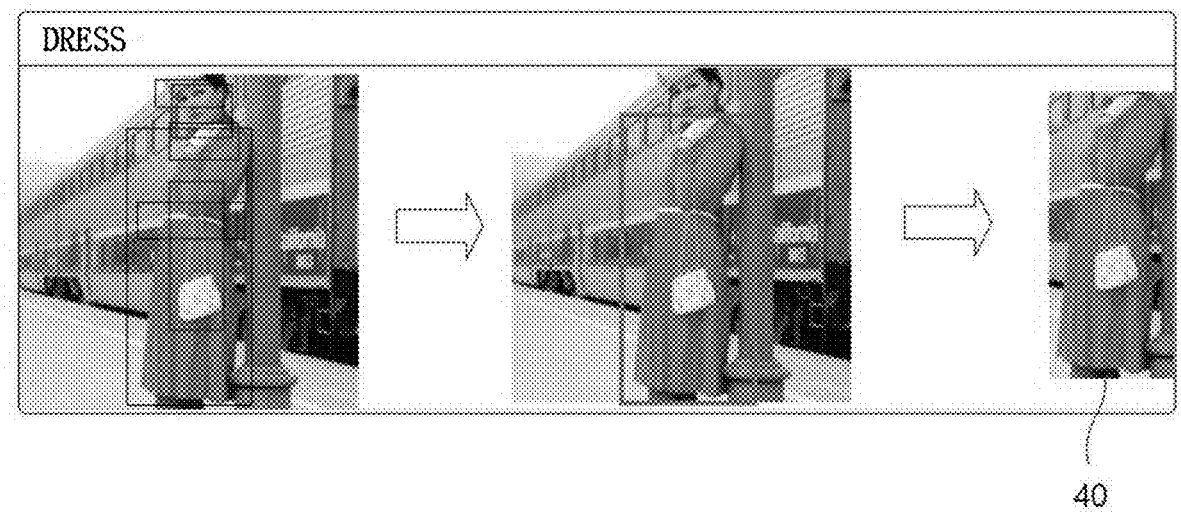

[FIG. 9]

METHOD AND SYSTEM FOR PRODUCT SEARCH BASED ON DEEP-LEARNING

CROSS REFERENCE TO RELATED APPLICATION

This application claims priority from and benefits of Korean Patent Application No. 10-2020-0124360, filed on Sep. 25, 2020, which is hereby incorporated by reference for all purposes as if fully set forth herein.

BACKGROUND

Technical Field

The present disclosure generally relates to a method and a system for performing product search based on deep learning. More particularly, some embodiments of the present disclosure relate to a method and a system for performing product search based on deep learning that can improve the performance of image-based product search.

Related Art

As is well known, according to the increase of the Internet speed and advances in multimedia technology, multimedia web information is being distributed widely through the Internet. According to the advances in security technology for distributing products over the Internet, transactions of products and various services mainly carried out offline are being handled through online Internet shopping malls.

Here, the online shopping mall may refer to a place where products may be purchased and sold online through a network such as the Internet.

These online shopping malls require differentiated services that may increase their competitiveness as the number of individual online shopping malls increases rapidly in recent years, and the online shopping malls now require various solutions to provide differentiated services.

Moreover, due to the explosive increase in the number of products sold through the online shopping mall, an effective technique for searching a vast amount of products existing online is required.

Therefore, techniques that provide image-based product search to satisfy the needs of a user, namely, an online shopper, when the user searches an online shopping mall for a product but does not know the product name, has difficulty in finding the product through existing search methods (for example, a category-based or keyword-based search), or wants to check products similar to the desired product conveniently are needed.

Specifically, when the user inputs an image including a product for search, an image-based product search technique may extract a feature vector, a parameter specifying an object included in the input image, search for the corresponding product based on the extracted feature vector, and provide the searched product.

However, the accuracy of a feature vector extracted from a product to be searched may be degraded depending on which pose is taken by a model (e.g. a human or a dummy) included in an image including the corresponding product, namely, which posture is taken by the model.

In other words, depending on the pose of a model wearing a product to be searched, parameters representing the characteristics of the corresponding product (for example, texture, fabric, shape, style, and/or color parameter) are affected, which causes the reliability of the feature vector extracted from the corresponding product to be degraded.

Meanwhile, Artificial Intelligence (AI), based on a neural network that mimics the human brain, has evolved dramatically along with the advances of a deep learning technology that enables a computer to gather, analyze, and learn external data autonomously.

Therefore, nowadays, a computer can substitute humans for analyzing a vast amount of data and clustering or classifying objects or data.

Also, along with advances of an image deep-learning technology which applies a neural network to image processing, there is a growing interest in developing various methods employing image segmentation, image inpainting, and image composition.

PRIOR ART REFERENCES

Patents (Patent 1) Korean Patent No. 10-1852598 B1

SUMMARY

The present disclosure has been made in an effort to provide a method and a system for performing product search based on deep learning, which can improve the performance of a product search technique performed based on images.

Specifically, the present disclosure has been made in an effort to provide a method and a system for performing product search based on deep learning, which generates an image that standardizes a pose of a model (e.g. a human or a dummy) included in the image including a target product to be searched.

A method and a system for product search based on deep learning according to an embodiment of the present disclosure provides a method for performing a product search based on deep learning by a product search application executed by a computing device, the method comprising obtaining an input image including a target product to be searched; transforming a model pose within the obtained input image; obtaining a standard input image in which the model pose has been transformed; obtaining a main product image formed into a predetermined area including the target product by performing deep learning based on the obtained standard input image; detecting a feature vector based on the obtained main product image; performing a product search that searches for a product similar to the target product based on the detected feature vector; and providing a result of the product search.

At this time, the transforming the model pose within the input image includes transforming a model pose within the input image using deep-learning based on a first standard pose.

Also, the first standard pose includes coordinate information of a main body key-point of a model within the standard input image.

Also, the first standard pose is an image obtained by graphic imagination of coordinate information of the main body key-point.

Also, the standard input image is an image obtained by transforming a model pose within the input image into the first standard pose.

Also, the transforming the model pose within the input image further includes transforming the model pose within the input image into the first standard pose using an image deep-learning neural network trained based on a training data set including a plurality of product images based on the first standard pose.

Also, the transforming the model pose within the input image further includes performing semantic segmentation on the input image, detecting at least one or more object areas within the input image based on the performed semantic segmentation, and obtaining a semantic label map for the input image based on the input image from which the at least one or more object areas have been detected and the first standard pose.

Also, the semantic label map is a map image that divides the at least one or more object areas within the input image according to the respective main body key-points.

Also, the obtaining the standard input image includes obtaining the standard input image that transforms the model pose within the input image into the first standard pose based on the semantic label map.

A method and a system for product search based on deep learning according to an embodiment of the present disclosure may generate an image that standardizes a pose of a model (for example, but not limited to, a human or a dummy) included in an image including a target product to be searched and perform a product search based on the generated image, thereby minimizing a problem that the accuracy of a feature vector for the target product is degraded depending on the model's pose in the image including the corresponding target product.

Also, a method and a system for a product search based on deep learning according to an embodiment of the present disclosure may minimize a conventional art's problem that the accuracy of a feature vector for the target product is degraded depending on the model's pose in an image including the corresponding target product and as a result, can improve the performance of an image-based product search.

Also, a method and a system for a product search based on deep learning according to an embodiment of the present disclosure may extract a feature vector for a target product in an input image under the same model pose condition for all input images by performing a product search by generalizing (or standardizing or unifying) the pose of a model included in the input image including the target product regardless of the model pose therein. Therefore, the method and system may consistently provide a product search result based on the corresponding feature vector.

Also, a method and a system for product search based on deep learning according to an embodiment of the present disclosure may improve the quality of an image-based product search for an online shopping mall, thereby providing an effect of not only making the online shopping mall easy to use but also increasing the competitiveness of the online shopping mall.

Also, a method and a system for product search based on deep learning according to an embodiment of the present disclosure may implement a product search service in an online shopping mall through deep learning using a trained deep-learning neural network, thereby detecting and providing a product search result more accurately and quickly.

BRIEF DESCRIPTION OF THE DRAWINGS

FIG. 1 is a conceptual diagram for illustrating a method and a system for product search based on deep learning according to an embodiment of the present disclosure.

FIG. 2 illustrates an internal block diagram of a mobile-type computing device according to an embodiment of the present disclosure.

FIG. 3 illustrates an internal block diagram of a desktop-type computing device according to an embodiment of the present disclosure.

FIG. 4 illustrates an internal block diagram of a product search server according to an embodiment of the present disclosure.

FIG. 5 is a flow diagram illustrating a method for product search based on deep learning according to an embodiment of the present disclosure.

FIG. 6 illustrates a method for obtaining a standard input image according to an embodiment of the present disclosure.

FIG. 7 illustrates a segmentation method using deep learning according to an embodiment of the present disclosure.

FIG. 8 illustrates an example of a main product image according to an embodiment of the present disclosure.

FIG. 9 is an example of graphic imagination of feature vectors by 2D transformation according to an embodiment of the present disclosure.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various other forms. In the following embodiments, the terms such as first and second are introduced to distinguish one element from the others, and thus the technical scope of the present disclosure should not be limited by those terms.

FIG. 1 is a conceptual diagram for illustrating a method and a system for product search based on deep learning according to an embodiment of the present disclosure.

Referring to FIG. 1, a system for product search based on deep learning according to an embodiment of the present disclosure may include one or more computing devices 100, a product search server 400, and a shopping mall server 500.

In the embodiment, the computing device 100, the product search server 400, and the shopping mall server 500 may operate in conjunction with each other through execution of a product search application provided by the product search server 400 (hereinafter a "search application") to perform deep learning of images used for a product search in an online shopping mall and provide a product search service (hereinafter a "produce search service") based on deep learning that performs a product search by generating an image that standardizes a pose of a model (for example, but not limited to, a human or a dummy) in an image including a target product to be searched.

Specifically, in the embodiment, the computing device 100 may install a search application by downloading the application from the product search server 400 or the application provision server and provide a product search service by operating the search application.

At this time, according to the embodiment, the search application may be an application capable of providing a comprehensive online product search platform including a keyword-based search service, a category-based search service, and/or an image-based search service related to a product search in the online shopping mall.

In the embodiment below, descriptions are given regarding a process of performing a product search in an online shopping mall based on an image including a target product to be searched by the search application; however, the present disclosure is not limited to the descriptions and various alternate embodiments may also be applied.

Meanwhile, the computing device 100, the product search server 400, and the shopping mall server 500 of FIG. 1 may be connected through a network.

Here, the network refers to a connection structure enabling exchange of information between individual nodes, such as the computing device 100, the product search server 400, and the shopping mall server 500, where examples of the network include a 3rd Generation Partnership Project (3GPP) network, a Long Term Evolution (LTE) network, a World Interoperability for Microwave Access (WiMAX) network, Internet, a Local Area Network (LAN), a Wireless Local Area Network (WLAN), a Wide Area Network (WAN), a Personal Area Network (PAN), a Bluetooth network, a satellite broadcasting network, an analog broadcasting network, and a Digital Multimedia Broadcasting (DMB) network; but are not limited to the above.

Computing Device 100

The computing device 100 according to the embodiment of the present disclosure may provide an environment for using a product search service and execute the search application capable of performing deep learning of images used for a product search of an online shopping mall within the product search service environment and performing a product search by generating an image that standardizes a pose of a model (e.g. a human or a dummy) in an image including a target product to be searched.

According to the embodiment, the computing device 100 may include various types of computing devices 100 (for example, a mobile type or desktop type computing device) in which the search application is installed.

1. Mobile Type Computing Device 200

A mobile type computing device 200 according to the embodiment of the present disclosure may be a mobile device such as a smartphone or a tablet PC in which the search application is installed.

For example, examples of the mobile type computing device 200 may include a smartphone, a mobile phone, a digital broadcasting terminal, a Personal Digital Assistant (PDA), a Portable Multimedia Player (PMP), and a tablet PC.

FIG. 2 illustrates an internal block diagram of a mobile-type computing device according to an embodiment of the present disclosure.

Referring to FIG. 2, a mobile type computing device 200 according to an exemplary implementation may include a memory 210, a processor assembly 220, a communication module 230, an interface module 240, an input system 250, a sensor system 260, and a display system 270. These constituting elements may be arranged to be included within a housing of the mobile type computing device 200 although it is not required.

Specifically, the memory 210 may be configured to store the search application 211. The search application 211 may store at least one or more of various application programs, data, and commands for providing an environment for implementing a product search service.

For example, the memory 210 may include an input image, product information, a standard input image, a main product image, and/or feature vector information.

In other words, the memory 210 may store commands and data for generating an environment for the product search service.

Also, the memory 210 may include at least one or more non-volatile computer-readable storage media and volatile computer-readable storage media. For example, the memory 210 may include various storage devices such as a ROM, an EPROM, a flash drive, a hard drive, and web storage that performs a storage function of the memory 210 on the Internet.

The processor assembly 220 may include at least one or more processors capable of executing commands of the search application 211 stored in the memory 210 to perform various tasks for implementing an environment for the product search service.

The processor assembly 220 according to the embodiment may be configured to control the overall operation of constituting elements through the search application 211 of the memory 210 to provide the product search service.

The processor assembly 220 may include a Central Processing Unit (CPU) and/or a Graphics Processing Unit (GPU). Also, the processor assembly 220 may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for performing miscellaneous functions.

The communication module 230 may include one or more devices for communicating with other computing devices (for example, the product search server 400). The communication module 230 may perform communication through a wired or wireless network.

Specifically, the communication module 230 may be configured to communicate with a computing device storing content sources for implementing an environment for the product search service and may communicate various user input components such as a controller that receives user inputs.

The communication module 230 according to the embodiment may be configured to transmit and receive various types of data related to the product search service to and from the product search server 400 and/or other computing devices 100.

The communication module 230 may transmit and receive data wired or wirelessly to and from at least one of a base station, an external terminal, and a particular server on a mobile communication network constructed through a communication apparatus compliant with technology standards or communication methods for mobile communication (for example, Long Term Evolution (LTE), Long Term Evolution-Advanced (LTE-A), 5G New Radio (NR), or WiFi) or a short distance communication method.

The sensor system 260 may include various sensors such as an image sensor 261, a position sensor (IMU) 263, an audio sensor 265, a distance sensor, a proximity sensor, and a touch sensor.

The image sensor 261 may be configured to capture an image of the physical space in the surroundings of the mobile type computing device 200.

The image sensor 261 according to the embodiment may capture an image (for example, an input image) related to the product search service.

Also, the image sensor 261 may be disposed on the front and/or rear surface of the mobile type computing device 200 to obtain an image of the surroundings along the disposed direction and capture a physical space through a camera disposed toward the outside of the mobile type computing device 200.

The image sensor 261 may include an image sensor device and an image processing module. Specifically, the image sensor 261 may process a still image or a video obtained by the image sensor device (for example, a CMOS or CCD sensor).

Also, the image sensor 261 may extract required information by processing a still image or a video obtained through the image sensor device using an image processing module and forward the extracted information to the processor.

The image sensor 261 may be a camera assembly including at least one or more cameras. The camera assembly may include at least one of a regular camera taking a photograph in the visible light band and a special camera such as an infrared camera or a stereo camera.

IMU 263 may be configured to detect at least one or more of a motion and an acceleration of the mobile type computing device 200. For example, the IMU 263 may comprise various positioning sensors such as accelerometers, gyroscopes, and magnetometers. Also, in conjunction with a position module such as GPS of the communication module 230, the IMU 263 may recognize spatial information of the physical space in the surroundings of the mobile type computing device 200.

Also, the IMU 263 may extract information related to the detection and tracking an eye gaze direction and a user's head motion based on the detected position and orientation.

Also, in some implementation, the search application 211 may determine the user's position and orientation within a physical space or recognize features or objects within the physical space by using the IMU 263 and the image sensor 261.

The audio sensor 265 may be configured to recognize a sound in the surroundings of the mobile type computing device 200.

Specifically, the audio sensor 265 may include a microphone capable of sensing a voice input of a user of the mobile type computing device 200.

The audio sensor 265 according to the embodiment may receive, from the user, voice data required for a product search service.

The interface module 240 may connect the mobile type computing device 20 to one or more different devices for communication. Specifically, the interface module 240 may include a wired and/or wireless communication device compatible with one or more different communication protocols.

The mobile type computing device 200 may be connected to various input-output devices through the interface module 240.

For example, the interface module 240, being connected to an audio output device such as a headset port or a speaker, may output an audio signal.

The audio output device may be connected through the interface module 240, but a different embodiment in which the audio output device is installed inside the mobile type computing device 200 may also be implemented.

The interface module 240 may comprise at least one of a wired/wireless headset port, an external charging port, a wired/wireless data port, a memory card port, a port connecting to a device equipped with an identification module, an audio Input/Output (I/O) port, a video I/O port, an earphone port, a power amplifier, an RF circuit, a transceiver, and other communication circuits.

The input system 250 may be configured to detect a user input (for example, a gesture, a voice command, a button operation, or other type of input) related to a product search service.

Specifically, the input system 250 may include a button, a touch sensor, and the image sensor 261 that receives a user's motion input.

Also, the input system 250, being connected to an external controller through the interface module 240, may receive a user's input.

The display system 270 may be configured to output various information related to a product search service as a graphic image.

The display system 270 may include at least one of a Liquid Crystal Display (LCD), a Thin Film Transistor-Liquid Crystal Display (TFT-LCD), an Organic Light-Emitting Diode (OLED), a flexible display, a three-dimensional (3D) display, and an electronic ink (e-ink) display.

The constituting elements may be disposed within a housing of the mobile type computing device 200 although it is not required, and a user interface may include a touch sensor 273 on a display 271 configured to receive a user's touch input.

Specifically, the display system 270 may include the display 271 outputting an image and a touch sensor 273 detecting a user's touch input.

The display 271 may be implemented as a touch screen by forming a layered structure or being integrated with the touch sensor 273. The touch screen may not only function as a user input unit providing an input interface between the mobile type computing device 200 and the user but also provide an output interface between the mobile type computing device 200 and the user.

2. Desktop Type Computing Device 300

FIG. 3 illustrates an internal block diagram of a desktop-type computing device according to an embodiment of the present disclosure.

In describing the constituting elements of a desktop type computing device 300, repeated descriptions are substituted by the descriptions of the corresponding constituting elements of the mobile type computing device 200, and descriptions are given mainly to the difference from the mobile type computing device 200.

Referring to FIG. 3, the desktop type computing device 300 may further include a device equipped with a program for executing a product search service based on wired/wireless communication, such as a fixed desktop PC, a laptop computer, or a ultrabook in which the search application 311 is installed.

Also, the desktop type computing device 300 may receive a user input (for example, a touch input, a mouse input, a keyboard input, a gesture input, and a motion input using a guide tool) using a user interface system 350.

The desktop type computing device 300 according to an embodiment may receive or obtain a user input by connecting the user interface system 350 to at least one device such as a mouse 351, a keyboard 352, a gesture input controller, an image sensor 361 (for example, a camera), and an audio sensor 365 via various communication protocols.

Also, the desktop type computing device 300 may be connected to an external output device through the user interface system 350, for example, a display device 370 or an audio output device.

Also, the desktop type computing device 300 according to the embodiment may include a memory 310, a processor assembly 320, a communication module 330, a user interface system 350, and an input system 340. These constituting elements may be included within a housing of the computing device 100, 300.

Descriptions of the constituting elements of the desktop type computing device 300 are substituted by the descriptions given to the constituting elements of the mobile type computing device 200.

Since the constituting elements of FIGS. 2 and 3 according to the present embodiment may be not essential to implement the computing device 100, the computing device 100 according to the present disclosure may have a greater or fewer number of constituting elements than listed above.

Product Search Server 400

A product search server 400 according to an embodiment of the present disclosure may perform a series of processes for providing a product search service.

Specifically, the product search server 400 may provide the product search service by exchanging required data with the computing device 100 to operate the search application in the computing device 100.

More specifically, the product search server 400 according to the embodiment may provide an environment in which the search application may operate in the computing device 100.

Also, the product search server 400 may perform image deep-learning required for a product search service.

Also, the product search server 400 according to the embodiment may transform a pose of a model (hereinafter a "model pose") included in a predetermined image into a preconfigured first standard pose.

Also, the product search server 400 according to the embodiment may perform a product search on an online shopping mall based on the predetermined image.

Also, the product search server 400 may collect and manage various types of data required for the product search service.

FIG. 4 illustrates an internal block diagram of a product search server according to an embodiment of the present disclosure.

More specifically, referring to FIG. 4, a product search server 400 may include a service providing server 410, a deep learning server 420, a pose transformation server 430, a product detection server 440, and a database server 450.

At this time, depending on embodiments, the respective constituting element may be implemented by separate devices different from the product search server 400 or may be implemented inside the product search server 400. In what follows, each constituting element may be included in the product search server 400, but the present disclosure is not limited to the assumption.

Specifically, the service providing server 410 may provide an environment in which the search application may operate in the computing device 100.

In other words, the service providing server 410 may provide an environment in which the search application that provides a product search service based on image restoration may operate in the computing device 100.

To this end, the service providing server 410 may include an application program, data, and/or commands for implementing a search application.

Also, the deep learning server 420 may perform image deep-learning required for a product search service in conjunction with an image deep-learning neural network.

Here, the image deep-learning neural network may include at least one of a Convolution Neural Network (CNN), for example, a U-net CNN and a Mask R-CNN.

According to the embodiment, the deep learning server 420 associated with an image deep-learning neural network may perform, based on the image input to the image deep-learning neural network, a functional operation using image processing techniques, such as object detection, segmentation, feature map extraction, and/or feature vector detection.

In particular, by performing the image deep-learning, the deep learning server 420 according to the embodiment may output product information, a pose type, and/or a standard input image based on the input image including a target product and provide the output information to the computing device and/or another server (for example, the pose transformation server 430 and/or the product detection server 440).

Also, the deep learning server 420 according to the embodiment may pre-train the image deep-learning neural network based on the preconfigured first standard pose.

Specifically, the deep learning server 420 may pre-train the image deep-learning neural network based on a training data set including a plurality of product images based on the first standard pose to transform the model pose included in the input image into the first standard pose.

Also, the pose transformation server 430 may transform the pose of a model (e.g. a human or a dummy) included in a predetermined image (for example, in some embodiments, an input image) into the preconfigured first standard pose.

Specifically, the pose transformation server 430 according to the embodiment may perform image deep-learning on an input image including a target product in conjunction with the deep learning server 420.

Also, the pose transformation server 430 may transform a predetermined pose of a model included in an input image into the preconfigured first standard pose by performing the deep learning.

And the pose transformation server 430 may receive or obtain and provide an input image having a model pose transformed into the first standard pose as a standard input image.

More specifically, the pose transformation server 430 according to the embodiment may include a semantic label map generator.

Here, the semantic label map generator may be a map image generation module that categorizes or divides areas included in an input image into areas including body parts of a model (for example, a human or a dummy) and products, and other areas.

The semantic label map generator according to the embodiment may generate a map image that categorizes or divides areas included in an input image into a plurality of areas consisting of body part areas (for example, a face area (including an eye area, a nose area, an ear area, and/or a neck area), a shoulder area, an elbow area, a wrist area, a hip area, a knee area, and/or an ankle area), areas including products, and other areas.

Also, the pose transformation server 430 may provide the generated standard input image to an external device (in the embodiment, the computing device 100) and/or another server (in the embodiment, the product detection server 440).

Also, the product detection server 440 may perform a product search service for an online shopping mall performed based on a predetermined image.

The product detection server 440 according to the embodiment may perform a product search on an online shopping mall based on an image that standardizes a pose of a model (e.g. a human or a dummy) included in an input image including a target product. Through this operation, the product detection server 440 may detect, obtain, and provide a product corresponding to the target product included in the corresponding image from the corresponding online shopping mall.

Also, the database server 450 may store and manage various application programs, applications, commands, and/or data for implementing the product search service.

The database server 450 according to the embodiment may store and manage an input image, product information, a standard input image, a main product image, and/or feature vector information.

In particular, the database server 450 according to the embodiment may include a feature vector database for storing and managing feature vector information for each product of the shopping mall server 500.

Specifically, the database server 450, in conjunction with at least one or more shopping mall servers 500, may construct a feature vector database that stores the feature vector information of each of at least one or more products provided by each shopping mall server 500.

At this time, the feature vector information for each of at least one or more products provided by each shopping mall server 500 may be obtained based on deep learning of the image of the corresponding product.

As described above, a series of functional operations for acquiring a feature vector of the corresponding image by performing image-based deep learning will be described in detail with reference to a method for product search based on deep learning to be described below.

Meanwhile, the product search server 400 including the constituting elements above may comprise at least one or more service providing servers 410, the deep learning server 420, the pose transformation server 430, the product detection server 440, and/or the database server 450. The product search server 400 may include one or more processors for data processing and one or more memories for storing commands for providing a product search service.

Also, according to the embodiment of the present disclosure, the product search server 400 may be configured to perform image deep-learning required for a product search service, transform a model pose in a predetermined image into a preconfigured first standard pose, perform a product search based on a predetermined image, and collect and manage various data required for the product search service. However, depending on embodiments, different implementation may also be made such that the computing device 100 can perform part of the functional operations performed by the product search server 400.

Shopping Mall Server 500

A shopping mall server 500 according to an embodiment of the present disclosure may perform a series of processes for providing an online shopping mall service.

More specifically, the shopping mall server 500 according to the embodiment may provide the computing device 100 with an environment for providing an e-commerce online shopping mall service in which a user may order or sell a product through the network.

Also, the shopping mall server 500 may transmit and receive various types of data required for a product search service to and from the computing device 100 and/or the product search server 400.

The shopping mall server 500 according to the embodiment may transmit product information on a plurality of products (for example, a product image and/or product information) on an online shopping mall to the computing device 100 and/or the product search server 400, and may receive information related to the needs for a specific product on the online shopping mall (for example, information on the product searched from the corresponding online shopping mall) from the computing device 100 and/or the product search server 400.

Also, the shopping mall server 500 may store at least one or more of application programs, data, and commands required for functional operations related to an online shopping mall service.

According to the embodiment, the shopping mall server 500 may store and manage product images and/or product information of at least one or more products on the online shopping mall.

More specifically, referring to FIG. 1, the shopping mall server 500 may include a shopping mall service providing server 510, a product management server 520, and a data storage server 530.

Here, the shopping mall service providing server 510 may provide an environment that enables an online shopping mall service to operate on a computing device.

In other words, the shopping mall service providing server 510 may provide an environment for implementing an online shopping mall service providing an online shopping mall which is a virtual shop where a product may be bought or sold on the Internet using the computing device 100.

The shopping mall service providing server 510 according to the embodiment may include various application programs, data, and/or commands capable of implementing a service provided in conjunction with an online shopping mall service.

Also, the product management server 520 may perform a management function for at least one or more products provided based on an online shopping mall service.

The product management server 520 according to the embodiment may manage a product name, a product image, a product price, and/or remaining quantities of the product.

Also, the data storage server 530 may store and manage various application programs, applications, commands, and/or data for implementing an online shopping mall service.

For example, the data storage server 530 may store and manage personal information, shopping information, and/or order information for each user who uses an online shopping mall service by matching the information to the corresponding user account.

The shopping mall server 500 including the constituting elements above may comprise at least one or more of the shopping mall service providing server 510, the product management server 520, and/or the data storage server 530, and may include one or more processors for data processing and one or more memories for storing commands for providing an online shopping mall service.

Method for Product Search Based on Deep Learning

In what follows, a method for performing a product search by a search application 211, 311 of the computing device 100 using image deep-learning will be described in detail with reference to FIGS. 5 to 9.

Here, in the exemplary embodiment of the present disclosure, the search application 211, 311 may be the search application 211 of the mobile-type computing device 200 and/or the search application 311 of the desk-type computing device 300.

In what follows, a process of performing a product search based on image deep-learning will be described in detail with reference to the search application 211 of the mobile-type computing device 200.

FIG. 5 is a flow diagram illustrating a method for performing product search based on deep learning according to an embodiment of the present disclosure.

Referring to FIG. 5, the mobile-type computing device 100 according to the embodiment may perform deep learning of images used for a product search in an online shopping mall and execute the search application 211 capable of performing a product search by generating an image that standardizes a pose of a model (such as a human or a dummy) in an image including a target product to be searched or run the search application 211 in the background mode.

Then the search application 211 executed or run in the background mode may obtain an input image of a target product to be searched and product information on the target product (step S101).

According to the embodiment, the input image may be an image capturing the target product to be searched.

Also, the product information according to the embodiment may be information that describes the target product and include category information of the target product (for example, product group information that classifies a product into top, bottom, dress, or swimsuit).

Specifically, the search application 211 according to the embodiment may provide an image-based search interface through which an image and product information of a target product to be searched may be input.

Also, the search application 211 may receive or acquire an input image of a target product and product information on the target product based on the user input through the provided search interface.

Also, the search application 211 according to the embodiment may generate or obtain a standard input image by transforming a model pose included in the input image acquired as described above.

FIG. 6 is an example illustrating a method for obtaining a standard input image according to an embodiment of the present disclosure.

Referring to FIG. 6, the standard input image 30 according to the embodiment may be an image in which a pose of a model (e.g. a human or a dummy) included in an input image 10 obtained based on a search interface has been transformed into the preconfigured first standard pose 20.

Here, the first standard pose 20 according to the embodiment is information used as a reference according to which to unify (or generalize) a model pose in the input image 10 into a predetermined model pose. The information may be the type of a pose to be applied to a model pose within the standard input image 30, namely, the coordinate information of key-points of a main body of a model within the standard input image 30.

The first standard pose 20 according to the embodiment may include information of coordinates of key-points of a main body including a face area (including an eye area, a nose area, an ear area, and/or a neck area), a shoulder area, an elbow area, a wrist area, a hip area, a knee area, and/or an ankle area of a model in the standard input image 30.

At this time, the first standard pose 20 according to the embodiment may be preconfigured according to the type determined as a model pose optimized for a product search based on a user input and/or image deep-learning.

The first standard pose 20 according to the embodiment may be transformed or turned into an image based on the information included in the corresponding first standard pose 20.

Specifically, according to the embodiment, the computing device 100 and/or the product search server 400 may transform or turn the information of coordinates of each main body key-point included in the first standard pose 20 into a form of graphic images.

For example, the first standard pose 20 may be transformed or turned into a graphic image in a way that the information of the coordinates of a face area, a shoulder area, an elbow area, a wrist area, a hip area, a knee area, and/or an ankle area is indicated by a predetermined method (for example, indication of each coordinate using a solid line).

At this time, the first standard pose 20 transformed or turned into a form of a graphic image may be displayed in a different shape from each other so that each information can be distinguished easily from the others.

For example, the first standard pose 20 transformed or turned into a form of a graphic image may be displayed so that each coordinate information can be displayed in a different shape from the others. For example, a solid red line may indicate the coordinate information of the right shoulder area, and a solid orange line may indicate the coordinate information of the left shoulder area.

As described above, since the information of coordinates of each main body key-point in the first standard pose 20 is provided in the form of a graphic image, each coordinate information may be recognized more easily and, at the same time, transformed into a form more suitable for being input into image deep-learning.

Also, the first standard pose 20 according to the embodiment may be expressed via a plurality of channels based on the information included in the corresponding first standard pose 20.

In other words, the first standard pose 20 may be implemented or represented based on the coordinate information of each main body key-point expressed based on each channel.

For example, the first standard pose 20 may be implemented or represented based on a plurality of image channels expressing coordinate information of the face area, the shoulder area, the elbow area, the wrist area, the hip area, the knee area, and/or the ankle area.

At this time, the search application 211 according to the embodiment may transform the model pose included in a received or obtained input image into the first standard pose 20 in conjunction with the image deep-learning neural network.

Here, the image deep-learning neural network operating in conjunction with the search application 211 may be an image deep-learning neural network trained to transform a model pose included in the input image 10 into the first standard pose 20 using a training data set including a plurality of product images based on the first standard pose 20.

In other words, the search application 211 according to the embodiment may train the image deep-learning neural network to be optimized to transform a pose of a model (e.g. a human or a dummy) in an image into the predetermined first standard pose 20.

The search application 211 according to the embodiment may transform a model pose included in the input image 10 into the first standard pose 20 based on the image deep-learning neural network 1 trained based on the first standard pose 20.

In other words, the search application 211 according to the embodiment may perform a standardization task that transforms a model pose in the input image 10 into the first standard pose 20 in conjunction with the image deep-learning neural network 1 trained to transform a model pose in an image into the first standard pose 20.

FIG. 7 illustrates a segmentation method using deep learning according to an embodiment of the present disclosure.

Referring to FIG. 7, the search application 211 according to the embodiment may perform semantic segmentation on the input image 10 in conjunction with the image deep-learning neural network.

Here, the image segmentation is a technique that partitions a whole image into object areas, and may be a technique that segments object areas within the whole image in pixel units.

In other words, the search application 211 according to the embodiment may detect a plurality of object areas included in the corresponding input image 10 based on the semantic segmentation of the input image 10.

Also, the search application 211 according to the embodiment may generate a semantic label map 21 for the corresponding input image 10 based on the input image 10 on which the semantic segmentation has been performed and the first standard pose 20.

Specifically, the search application 211 may input the input image 10 on which the semantic segmentation has been performed and the first standard pose 20 to the image deep-learning neural network 1 trained based on the first standard pose 20 in conjunction of the product search server 400.

In other words, the search application 211 according to the embodiment may input the first standard pose 20 obtained by the graphic imagination of coordinate information of a body area (for example, a face area, a shoulder area, an elbow area, a wrist area, a hip area, a knee area, and/or an ankle area) of a model pose within a predetermined image according to a predetermined method (for example, indication of coordinates by solid lines) to the image deep-learning neural network 1 trained based on the first standard pose 20.

Then, the search application 211 may receive or obtain a standard input image 30 acquired by transforming a model pose in the input image 10 into the first standard pose 20 from the trained image deep-learning neural network 1 that has received the corresponding input image 10 and the first standard pose 20.

Specifically, the search application 211 according to the embodiment may receive or obtain a semantic label map 21 for the input image from the trained image deep-learning neural network 1 that has received the corresponding input image 10 and the first standard pose 20.

Here, the semantic label map 21 according to the embodiment may be a map image that categorizes or divides at least one or more object areas included in the input image 10 into the respective main body key-points.

For example, the semantic label map 21 may be a map image that categorizes or divides model object areas included in the input image 10 into a plurality of areas including the main body key-points of the corresponding model object such as a face area (including an eye area, a nose area, an ear area, and/or a neck area), a shoulder area, an elbow area, a wrist area, a hip area, a knee area, and/or an ankle area and product areas (at this time, all of the main body key-points may be distinguished from left to right).

Also, the search application 211 according to the embodiment may receive or obtain, based on the generated semantic label map image 21, a standard input image 30 obtained by transforming a model pose in the input image 10 into the first standard pose 20.

Specifically, the search application 211 according to the embodiment may input the semantic label map image 21 into the image deep-learning neural network implemented based on a model generation method using the Generative Adversarial Network (GAN).

Also, the search application 211 may receive or obtain the standard input image 30, obtained by transforming a model pose in the input image 10 to the first standard pose 20, from the GAN-based image deep-learning neural network receiving the semantic label map image 21 as an input.

In the embodiment of the present disclosure, the search application 211 transforms a model pose included in the input image 10 to obtain the standard input image 30 in conjunction with the product search server 400. However, depending on embodiments, different implementation may also be made such that the search application 211 may generate the standard input image 30 based on the input image 10 and the first standard pose 20 without involving an external device.

As described above, the search application 211 according to the embodiment performs a task or operation of transforming a model pose in the input image 10 into the predetermined first standard pose 20 using the image deep-learning neural network 1 trained based on the first standard pose 20, thereby minimizing a problem that the accuracy of a feature vector extracted from the corresponding target product is degraded depending on a model pose in the input image 10 and, as a result, providing an effect of improving the performance of an image-based product search.

In other words, the search application 211 according to the embodiment may perform a product search based on the input image 10 that includes a target product by transforming a model pose into the preconfigured first standard pose 20 regardless of the model pose therein. Then, the search application 211 may minimize the influence by the model pose imposed on the parameter representing the characteristics of the target product (for example, texture, fabric, shape, style, and/or color parameter). Through the operation above, the search application 211 may extract a feature vector of the corresponding target product more accurately without being influenced by the noise or obstruction due to the model pose in the input image 10.

Moreover, the search application 211 performs a product search by standardizing a model pose irrespective of the type of the model pose in the input image 10 that includes a target product. Therefore, the search application 211 may extract a feature vector of the target product within the corresponding input image 10 under the same model pose condition for all input images 10. At the same time, the search application 211 may provide a product search result based on the corresponding feature vector consistently.

Also, the search application 211 according to the embodiment may obtain a main product image by performing deep learning based on the standard input image 30 obtained as above.

FIG. 8 illustrates an example of a main product image according to an embodiment of the present disclosure.

Referring to FIG. 8, the search application 211 according to the embodiment may perform, based on deep learning, object detection on the standard input image 30.

Also, the search application 211 may obtain a main product image 40 including a target product object from a plurality of objects in the corresponding standard input image 30 based on the object detection.

Here, the main product image 40 according to the embodiment may be an image including a predetermined area configured based on an object representing the target product determined to be the product to be searched by a user among at least one or more objects included in the input image.

At this time, the main product image 40 may be obtained based on bounding boxes of at least one or more objects detected from the input image 10.

Here, the bounding box may be a box indicating boundaries of a predetermined area configured based on each of at least one or more objects included in the input image 10.

Specifically, the search application 211 according to the embodiment may perform image deep-learning based on the input image 10 in conjunction with the product search server 400 or by the application's own process.

Specifically, the search application 211 may perform image deep-learning that performs object detection on the input image 10 using an image deep-learning neural network.

And the search application 211 may detect at least one or more objects in the corresponding input image 10 through the object detection.

Also, the search application 211 according to the embodiment may generate a bounding box that indicates boundaries of a predetermined area configured based on each of the detected objects (for example, a rectangular box that indicates boundaries of a predetermined area surrounding the corresponding object).

At this time, the search application 211 according to the embodiment may use an image deep-learning neural network used for the object detection by training the network to be optimized for extracting an object related to fashion products from at least one or more objects within an image.

In other words, the search application 211 may perform the object detection using the pre-trained image deep-learning neural network to specify that at least one or more objects detected from the input image 10 correspond to a fashion-related product and to generate a bounding box for the corresponding fashion product.

For example, the search application 211 may operate in conjunction with a fashion detector, an image deep-learning neural network trained to be optimal for extracting a fashion-related object.

And the search application 211 may detect a fashion-related object and a predetermined area occupied by the corresponding object in the input image 10 in conjunction with the fashion detector.

Also, the search application 211 may perform fashion detection by generating a bounding box for each detected fashion-related object.

At this time, an example of the fashion detector may include a first convolution neural network (Conv 1) that passes an input image 10 to a convolution layer at least once and a second convolution neural network (Conv 2) composed of a region of interest (RoI) pooling layer, a softmax function, and a bounding box regressor.

Specifically, the first convolution neural network (Conv 1) may receive a whole image and an object candidate area simultaneously as inputs.

And the first convolution network processes the whole image at once through a convolution layer and a max-pooling layer and generates a feature map that categorizes or binds meaningful objects into feature areas.

Next, the second convolution network passes each object candidate area to the RoI pooling layer to extract a fixed-length feature vector from the feature map.

And the second convolution network applies the extracted feature vector to the Fully-Connected Layer (FCL) and then applies the output data of the FCL to the softmax function disposed at the final stage to specify the type of each object.

At this time, the second convolution network may be trained to extract only a fashion-related object from various types of objects.

Also, the second convolution network may extract a bounding box representing an area occupied by a fashion-related object by applying the output data of the fully connected layer to the bounding box regressor.

The fashion detector having the first convolution network and the second convolution network may specify that the type of an object in the input image 10 is a fashion-related item and extract a feature area occupied by the corresponding product as a bounding box.

In other words, the search application 211 may specify that the type of an object in the input image 10 is a fashion-related product and extract a feature area occupied by the corresponding product as a bounding box by performing deep learning using a deep-learning neural network trained to detect a fashion product.

Back to the description, the search application 211 which has detected at least one or more objects in the input image 10 through the object detection and has generated the bounding box for the detected object may detect an object representing a target product from at least one or more objects in the input image 10 based on the obtained product information.

And the search application 211 may obtain the main product image 40 based on the image of the bounding box for the detected target product object.

Specifically, the search application 211 according to the embodiment may detect a bounding box including an object matching the obtained product information from at least one or more bounding boxes obtained based on the trained image deep-learning neural network.

Also, the search application 211 may extract an image of the detected bounding box and set the extracted image as the main product image 40.

For example, when the category of the obtained product information is 'dress,' the search application 211 may detect a bounding box including a dress object from a plurality of objects detected from the input image 10.

And the search application 211 may generate the main product image 40 representing a predetermined area including the dress, which is the target product, based on the image area included in the detected bounding box.

As described above, by generating bounding boxes for at least one or more objects included in an input image 10, detecting a bounding box including a target product from the generated bounding boxes, and setting the detected bounding box as the main product image 40, the search application 211 may extract only the area related to the target product to be searched by the user from the input image 10 and attempt to reduce a data processing load and improve the search speed by performing subsequent functional operations for the product search service based on the extracted area.

Also, the search application 211 according to the embodiment may detect a feature vector based on the obtained main product image 40 (step S107).

Here, the feature vector according to the embodiment may be a parameter (or variable) specifying a feature of an object included in an image.

The feature vector according to the embodiment may include, for example, but not limited to, at least one or more of texture, fabric, shape, style, and/or color parameter, where each parameter value may be derived based on a deep learning neural network (for example, a pre-trained deep learning neural network for feature vector extraction).

In what follows, for the sake of effective description, those overlapping with the description of a process for extracting a feature vector from an image will be summarized or omitted.

FIG. 9 is an example of graphic imagination of feature vectors by 2D transformation according to an embodiment of the present disclosure.

Referring to FIG. 9, the search application 211 according to the embodiment may perform image deep-learning based on the main product image 40 in conjunction with the product search server 400 or by the application's own process.

At this embodiment, the search application 211 may perform image deep-learning based on the main product image 40 using the image deep-learning neural network trained to extract a feature vector from the input image.

Here, the image deep-learning neural network trained to extract a feature vector may extract each feature vector value for at least one or more parameters among the texture, fabric, shape, style, and color parameters by using each feature vector extraction image deep-learning neural network for each parameter.

More specifically, the search application 211 according to the embodiment may perform image deep-learning based on the main product image 40 using the feature vector extraction image deep-learning neural network trained as described above.

And the search application 211 may extract a feature vector for the corresponding main product image 40 based on the image deep-learning performed.

More specifically, the search application 211 according to the embodiment may perform the training of the deep-learning model using various fashion product images when there is a deep-learning model (deep-learning neural network) based on fashion product images.

Also, the search application 211 may obtain a filter capable of distinguishing a fashion product object from other objects in the various fashion product images through the training process.

For example, the search application 211 may perform low-level learning for horizontal, vertical, and curved lines on the object in the first layer of the deep-learning model.

Also, the search application 211 may perform middle-level learning for a specific element constituting an object (for example, pattern, color, and/or texture) through the second layer.

Also, the search application 211 may perform high-level learning for the entire outline of the object in the third layer.

Afterward, the search application 211 according to the embodiment may input the feature map obtained through the learning to the softmax function included in the final layer of the deep-learning model, through which the object may be classified to a predetermined category.

As described above, the search application 211 may train a deep-learning model as a classifier capable of distinguishing a predetermined object from other objects among various fashion product images.

At this time, the feature vector may be a feature map of a particular layer among a plurality of layers before passing through the softmax.

In the example above, except for the fashion product image initially input to the network, a total of four convolution layers may be used or employed, and one of the feature maps from the layers may be selected to be used as a feature vector.

At this time, the feature vector extraction image deep-learning neural network performing image deep-learning may include a first convolution neural network (Conv 1) that passes an exemplary input image (in other words, the main product image 40) to a convolution layer at least once and a second convolution neural network (Conv 2) comprising an RoI pooling layer, a softmax function, and a bounding box regressor.

Here, the first convolution network may perform image processing on the main product image 40 through the convolution layer and the max-pooling layer and generate a feature map representing a feature area of a target product object in the main product image 40.

Also, the second convolution network may pass a target product object in the main product image 40 through the RoI pooling layer and extract a fixed-length feature vector from a feature map for the corresponding target product object.

In other words, the search application 211 according to the embodiment may perform image deep-learning using a trained feature vector extraction image deep-learning neural network to extract a feature vector for a target product object in the main product image 40.

Also, the search application 211 according to the embodiment may perform a product search based on a detected feature vector and output or provide a result of the performed product search.

Specifically, the search application 211 may perform a product search based on a feature vector detected from the main product image 40 based on a feature vector database constructed in conjunction with the shopping mall server 500.

More specifically, the search application 211 according to the embodiment may retrieve or read out, from the feature vector database, a product having a feature vector of which the similarity to the feature vector obtained from the main product image 40 satisfies a preconfigured criterion (for example, greater than or equal to a predetermined percentage) in conjunction with the product search server 400 or by the application's own process.

The search application 211 according to the embodiment may search the feature vector database based on various algorithms models (for example, FLANN, Annoy, and/or Brute Force search).

At this time, the search application 211 may compare the feature vector of the main product image 40 with a feature vector for at least one or more products of the feature vector database and measure the similarity between the feature vectors from the comparison.

For example, the search application 211 may detect top n products of which the measured similarity satisfies a preconfigured criterion (for example, greater than or equal to a predetermined percentage) (n is a positive integer that is equal to or greater than 1).

Also, the search application 211 may retrieve or obtain information related to the detected top n products (for example, information on a shopping mall selling the corresponding product, product information on the corresponding product, and/or image information) from the memory 210, 310 and/or a database of an external server.

Also, the search application 211 according to the embodiment may output the information related to an obtained product, namely, the information on a product search result based on the feature vector of the main product image 40 on the display 271 to provide the information to a user.

As described above, based on a feature vector for the main product image 40 in the input image 10 that has a model pose transformed into the first standard pose 20, the search application 211 performs an image deep learning-based online shopping mall product search and provides information on the product search result. Accordingly, the search application 211 may provide a highly reliable product search result based on more accurate and objective feature vector data and improve the competitiveness of an online shopping mall and user satisfaction.

As described above, a method and a system for product search based on deep learning according to an embodiment of the present disclosure may generate an image that standardizes a pose of a model (e.g. a human or a dummy) included in an image including a target product to be searched and perform a product search based on the generated image, thereby minimizing a problem that the accuracy of a feature vector for the target product is degraded depending on the model's pose within the image including the corresponding target product.

Also, a method and a system for a product search based on deep learning according to an embodiment of the present disclosure may minimize a conventional art's problem that the accuracy of a feature vector for the target product is degraded depending on the model's pose within an image including the corresponding target product and as a result, may improve the performance of an image-based product search.

Also, a method and a system for a product search based on deep learning according to an embodiment of the present disclosure may extract a feature vector for a target product in an input image under the same model pose condition for all input images by performing a product search by generalizing (or standardizing or unifying) the pose of a model in the input image including the target product regardless of the model pose therein. Therefore, the method and system may consistently provide a product search result based on the corresponding feature vector.

Also, a method and a system for product search based on deep learning according to an embodiment of the present disclosure may improve the quality of an image-based product search for an online shopping mall, thereby providing an effect of making the online shopping mall easy to use as well as increasing the competitiveness of the online shopping mall.

Also, a method and a system for product search based on deep learning according to an embodiment of the present disclosure may implement a product search service in an online shopping mall through deep learning using a trained deep-learning neural network, thereby detecting and providing a product search result more accurately and quickly.

Also, the embodiments of the present disclosure described above may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include a magnetic medium such as a hard-disk, a floppy disk, and a magnetic tape; an optical medium such as a CD-ROM and a DVD; a magneto-optical medium such as a floptical disk; and a hardware device specially designed to store and execute program commands such as a ROM, a RAM, and a flash memory. Examples of program commands include not only machine code such as one created by a compiler but also high-level language code which may be executed by a computer through an interpreter and the like. The hardware device may be configured to be operated by one or more software modules to perform the operations of the present disclosure, and vice versa.

What is claimed is:

1. A method for performing a deep learning based product search by a product search application executed by a computing device, the method comprising:
preconfiguring a first standard pose used as a reference to unify model poses in images into one predetermined model pose for product search by determining the preconfigured first standard pose, which is used as the reference optimized for performing the product search by an image deep-learning neural network, and setting coordinates of key-points of the preconfigured first standard pose based on the image deep-learning neural network, wherein the image deep-learning neural network is trained to transform the model poses in the images into the preconfigured first standard pose based on a training data set comprising a plurality of product images based on the preconfigured first standard pose;
receiving an input image including a target product to be searched;
transforming a pose of a model included in the received input image into the preconfigured first standard pose by the image deep-learning neural network based on the preconfigured first standard pose;
obtaining a standard input image in which the pose of the model included in the received input image is transformed into the preconfigured first standard pose;
obtaining a main product image having an area including the target product to be searched by performing deep learning based on the standard input image;
extracting a feature vector from the main product image which has the area including the target product and is obtained by performing the deep learning based on the standard input image having the transformed pose of the model;
performing the product search for a product similar to the target product based on the feature vector extracted from the main product image; and
outputting a result of the product search.

2. The method of claim 1, wherein the transforming of the pose of the model included in the received input image includes transforming the pose of the model included in the input image using deep-learning based on the preconfigured first standard pose.

3. The method of claim 2, wherein the preconfigured first standard pose includes information on coordinates of key-points of a main body of the model included in the standard input image having the transformed pose of the model.

4. The method of claim 3, wherein the preconfigured first standard pose is an image generated by graphic imagination of the information on the coordinates of the key-points of the main body of the model or information on coordinates of each key-point of the main body expressed by each image channel.

5. The method of claim 2, wherein the transforming of the pose of the model included in the input image further includes transforming the pose of the model included in the input image into the preconfigured first standard pose using the image deep-learning neural network trained based on the training data set including the plurality of product images based on the preconfigured first standard pose.

6. The method of claim 1, wherein the transforming of the pose of the model included in the input image further includes performing semantic segmentation on the input image, detecting one or more object areas included in the input image based on the performed semantic segmentation, and obtaining a semantic label map for the input image based on the input image from which the one or more object areas are detected and the preconfigured first standard pose including information on coordinates of key-points of a main body of the model included in the standard input image having the transformed pose of the model.

7. The method of claim 6, wherein the semantic label map is a map image that categorizes the one or more object areas included in the input image into a respective key-point of the main body.

8. The method of claim 7, wherein the obtaining of the standard input image having the transformed pose of the model includes obtaining the standard input image that transforms the pose of the model included in the input image into the preconfigured first standard pose based on the semantic label map.

9. A system for performing a deep learning based product search, the system comprising:
   a computing device executing a product search application configured to perform a deep learning based product search;
   a product search server configured to operate in association with the product search application; and
   a shopping mall server configured to provide data required for the deep learning based product search for an online shopping mall service, wherein the computing device is configured to:
   preconfigure a first standard pose used as a reference to unify model poses in images into one predetermined model pose for product search by determining the preconfigured first standard pose, which is used as the reference optimized for performing the product search by an image deep-learning neural network, and setting coordinates of key-points of the preconfigured first standard pose based on the image deep-learning neural network, wherein the image deep-learning neural network is trained to transform the model poses in the images into the preconfigured first standard pose based on a training data set comprising a plurality of product images based on the preconfigured first standard pose, receive an input image including a target product to be searched, transform a pose of a model included in the received input image into the preconfigured first standard pose by the image deep-learning neural network based on the preconfigured first standard pose, obtain a standard input image in which the pose of the model included in the received input image is transformed into the preconfigured first standard pose, obtain a main product image having an area including the target product to be searched by performing deep learning based on the standard input image, extracting a feature vector from the main product image which has the area including the target product and is obtained by performing the deep learning based on the standard input image having the transformed pose of the model, perform the product search for a product similar to the target product based on the feature vector extracted from the main product image, and output a result of the product search.

10. The system of claim 9, wherein the product search application configured to transform the pose of the model included in the input image using deep-learning based on the preconfigured first standard pose.

11. The system of claim 10, wherein preconfigured the first standard pose includes information on coordinates of key-points of a main body of the model included in the standard input image having the transformed pose of the model.

12. The system of claim 11, wherein the preconfigured first standard pose is an image generated by graphic imagination of the information on the coordinates of the key-points of the main body of the model or information on coordinates of each key-point of the main body expressed by each image channel.

13. The system of claim 10, wherein the product search application is configured to transform the pose of the model included in the input image into the preconfigured first standard pose using the image deep-learning neural network trained based on the training data set including the plurality of product images based on the preconfigured first standard pose.

14. The system of claim 9, wherein the product search application is configured to perform semantic segmentation on the input image, detect one or more object areas included in the input image based on the performed semantic segmentation, and obtain a semantic label map for the input image based on the input image from which the one or more object areas are detected and the preconfigured first standard pose including information on coordinates of key-points of a main body of the model included in the standard input image having the transformed pose of the model.

15. The system of claim 14, wherein the semantic label map is a map image that categorizes the one or more object areas included in the input image into a respective key-point of the main body.

16. The system of claim 15, wherein the product search application is configured to obtain the standard input image that transforms the pose of the model included in the input image into the preconfigured first standard pose based on the semantic label map.

17. A method for performing deep learning based product search by a product search application executed by a computing device, the method comprising:
   preconfiguring a first standard pose used as a reference to unify model poses in images into one predetermined model pose for product search by determining the preconfigured first standard pose, which is used as the reference optimized for performing the product search by an image deep-learning neural network, and setting coordinates of key-points of the preconfigured first standard pose based on the image deep-learning neural network, wherein the image deep-learning neural network is trained to transform the model poses in the images into the preconfigured first standard pose based on a training data set comprising a plurality of product images based on the preconfigured first standard pose;
   receiving an input image including a target product to be searched;
   detecting a model in the received input image;
   transforming a pose of the detected model into the preconfigured first standard pose by the image deep-learning neural network based on the preconfigured first standard pose;
   generating a standard input image in which the pose of the detected model included in the received input image is transformed into the preconfigured first standard pose;
   determining an area including the target product based on the generated standard input image having the preconfigured first standard pose;

obtaining a main product image by extracting an image of the determined area including the target product;

extracting a feature vector from the main product image obtained by extracting the image of the determined area including the target product;

performing the product search for a product similar to the target product based on the feature vector extracted from the main product image; and providing a product search result including an image of a product similar to the target product.

18. The method of claim 17, wherein the transforming of the pose of the detected model into the preconfigured first standard pose includes inputting the input image to the deep learning neural network that transforms the pose of the model into the preconfigured first standard pose when the input image includes the model.

* * * * *